United States Patent Office 2,879,167
Patented Mar. 24, 1959

2,879,167

PROCESS OF MAKING GERM FLAKES

Felix Grandel, Inningen, near Augsburg, Germany

No Drawing. Application June 24, 1954
Serial No. 439,125

Claims priority, application Germany June 26, 1953

1 Claim. (Cl. 99—80)

The present invention relates to a process of debittering germs and/or seedlings of cereals and more particularly to a process of producing debittered flakes of germs and/or seedlings of cereals, and to products obtained thereby.

It is known to debitter germs of cereals by roasting or by a treatment with alkali hydroxide solutions and to further process such debittered germs of cereals to food preparations. It is furthermore known to grind germs of cereals and to subject the resulting flour to a drying, roasting, mashing, fermenting, and the like process and to admix thereto other suitable materials.

All the heretofore known and used processes which are concerned with the improvement of germs of cereals, yield the desired result only incompletely. Either it was found that such processes can be carried out in practical operation only in an uneconomical manner and/or with great difficulties or the resulting final products are bitter and of disagreeable taste.

As stated above, it is known to grind germs of cereals. However, the oil content of the germs of cereals renders such a grinding process very difficult. When using germs of a high oil content such as, for instance, corn germs, it is almost impossible to carry out such grinding process. When aiming at the production of very finely comminuted germ flours by means of highly effective grinding and milling devices, said grinding and milling devies and sieves are smeared and become fouled by the high oil content of said cereal germs so that it becomes very rapidly impossible to technically carry out such operations. Furthermore, the resulting flours which are rich in oil are bitter and rapidly become rancid. The oil which is set free during grinding and milling is present at the surface of said flour particles, and therefore, is rapidly oxidized by atmospheric oxygen. Such flours rich in oil become unpalatable within a few days and the germ oil contained therein is split up to free fatty acids in an amount corresponding to about 80%.

It is one object of the present invention to provide a new and effective process which permits the production of stable germ flours in highly comminuted form by milling and grinding in highly effective milling and grinding devices.

Another object of the present invention consists in providing very finely comminuted cereal germ flours which are stable even on prolonged storage and are substantially free of any bitter taste and rancidity.

Other objects of the present invention and advantageous features thereof will become apparent as the description proceeds.

In principle, the process according to the present invention consists in first removing a substantial amount of the oil present in cereal germs, for instance, by hydraulic pressing and/or by extraction with solvents for oils. The deoiled cereal germs must not contain more than 4% of oil. Such substantially de-oiled cereal germs can then readily be milled and ground, without technical difficulties, on roller mills. The production of superfine flour from such ground and milled substantially de-oiled cereal germs by sifting and sieving does not cause any difficulty.

The resulting germ flours are comparatively stable, due to their low oil content. They can be stored in the same manner as wheat flour without becoming rancid. However, they still possess a bitter taste which limits their use as foodstuff. It has been found that the bitter taste of such germ flours is dependent upon their degree of comminution. Flours which have been ground only to a low degree of comminution and have as low a content of crude fiber and bran particles as possible, have the best taste while highly comminuted flours which contain large amounts of bran contain also large amounts of bitter components.

This observation proves that the bitter components of cereal germs are mainly enriched in bran and husk components of said material. Therefore, only germ flours of low degree of comminution are suitable for the production of a starting material which can be used in the manufacture of cereal germ flakes. It has been found that the degree of comminution must not be higher than 50%.

According to the present invention it has been found that cereal germ flakes of pleasant taste and free of bitter components can be produced from such a fine germ flour ground in highly effective grinding and milling devices in the manner described hereinbefore by converting such germ flour into a dough by kneading with water or other liquids such as milk, fruit juices and the like, and by drying such dough under specific conditions on a roller dryer of specific construction.

It is known to dry solid and liquid materials on roller dryers. It has, however, been found by extensive experiments that cereal germ flakes free of bitter components can economically and practically be produced only when using special drying apparatus as they are employed in the potato flake industry and furthermore, that debittering of such cereal germ flakes is achieved only when working within very definite temperature limits. Entirely unsuitable for the production of cereal germ flakes which are free of bitter components are belt-type dehydrators or conveyer drying machines, disc dryers, dryers with only a single roller, twin-cylinder spray-drying machines and similar types of dryers.

It has furthermore been found that debittering of the cereal germ flakes on such flaking rollers is preferably carried out at a temperature between about 130° and about 140° C. Thereby the rotation of the rollers is to be adjusted in such a manner that the flakes are heated to said temperature only for a short period of time so that they cannot burn. Furthermore, it has been found that maintaining such a temperature range is not only necessary in order to effect sufficient debittering but that heating to such a high temperature of 130–140° C. for a short period of time causes the lowest possible losses in vitamins.

A number of cereal germs contain bitter components which cannot completely be eliminated by said treatment on roller dryers at 130–140° C. They are, however, split up, and thus, eliminated by a treatment with sodium carbonate or sodium bicarbonate. Thereby cereal germ flakes of satisfactory taste can be obtained provided certain specific conditions are observed. It has been found that the amount of sodium carbonate or sodium bicarbonate to be added is adjusted according to the degree of acidity of the germ flour. Said degree of acidity is determined according to the method of Schulroth, which method indicates how many cc. of N/10 potassium hydroxide solution are necessary to neutralize the fatty acids present in 10 g. of flour. The addition of sodium carbonate or sodium bicarbonate according to the present invention not only removes the bitter components from said flour but also neutralizes the fatty acids.

Complete debittering of the cereal germ flours to be converted into flakes can be achieved by adding, during flaking, such amounts of sodium carbonate or sodium bicarbonate as are equivalent to the degree of acidity of said flour. If smaller amounts of said sodium carbonate or sodium bicarbonate are added, no debittering effect takes place because the free fatty acids are first neutralized before the bitter components which are glucoside compounds can be hydrolyzed. If larger amounts of such sodium carbonate or sodium bicarbonate are added to said flour, the flakes acquire a soapy taste. The addition of other alkali carbonates or alkali bicarbonates than sodium carbonate or sodium bicarbonate did not yield satisfactory results because such other alkali compounds unfavorably effect the taste of the treated flakes.

Other materials such as, for instance, milk powder, sugar, citric acid, flavoring materials and others may be added to the cereal germ flour during flaking. In this manner a savory breakfast or baby food is obtained. It is surprising that in such mixtures the taste of the flakes is even more agreeable than the taste of the mixture itself. It has been found that this improvement in taste is effected by maintaining the above mentioned temperature range on flaking the flour by means of rollers and is caused by caramelization of the sugar and the milk. The crude flakes leaving the potato flake dryer and the cooling tower are, for instance, equalized by passing them through a tearing apparatus comprising a toothed roller. The equalized flakes are then graded and sorted by a cascade cleaning machine while the dust carried along by the aspirator is recovered by means of a tubular revolving filter.

The following examples serve to illustrate the present invention without, however, limiting the same thereto:

Example 1

Corn germs as they are obtained according to the dry-degerminating process of Dr. Grandel or obtained on grinding and milling corn, or corn germs obtained in the cornstarch production by the flotation process, are thoroughly extracted with benzine. Said extraction is preferably carried out in apparatus as they are used in oil mills for extracting oil seeds. The resulting extraction residue still contains about 1% of fat. It is then finely ground in conventional milling apparatus. Grinding and milling is effected in such a manner that a 50% superfine flour is produced. The remaining residue is worked up according to the process of German Patent No. 840,047 to yield a feed of high nutritional value.

The superfine flour is mixed with about 30% to about 50% of its weight of water and the mixture is thoroughly kneaded in an endless screw-type mixer. Said moist flour is then conducted, by means of a conveyer device, to a roller dryer provided with feeding and supplying rollers such as they are used in the manufacture of potato flakes. The dryer should have a roller length of at least 2 m. and a roller diameter of at least 1 m. The rollers are preferably driven by a regulating-speed gear. The rollers are preferably heated by means of steam. The steam pressure within the rollers is adjusted in such a manner that the temperature of said rollers is about 130° C. to about 140° C.

Thoroughly kneaded flour paste is then supplied to said roller dryer and the speed of rotation is adjusted in such a manner that well dried flakes are obtained. Said flakes are of light brown color and have an agreeable nut-like taste. The flakes falling off said roller dryer are sifted and purified by means of air separators and are sieved over coarse sieves. This operation is necessary to prevent contamination of said flakes by moist and/or dry lumps of the paste to be dried which might fall off from the dryer. The flakes, after such purification, have a water content of 4–6%. They are especially suitable for the manufacture of dietetic food preparations, pharmaceutical preparations and in the confectionery industry.

Example 2

Corn germs obtained on dry-degermination of corn are de-oiled by subjecting them to the action of hydraulic presses. The resulting oil cakes have an oil content of about 4% and are ground and milled to a superfine flour as shown in Example 1. The resulting superfine flour is then mixed with 30% of dry buttermilk powder, 20% of sugar, 0.1% of citric acid, and 0.5% of table salt. The mixture is thoroughly kneaded with 50% of its weight of water and 50% of its weight of buttermilk and is flaked at 130–140° C. as described in Example 1. The resulting flakes are purified in the same manner as described in Example 1. They represent an excellent baby food and can also be used as breakfast cereal flakes.

Example 3

Rice germs are subjected to the action of hydraulic presses. The expressed residues are ground and milled to a superfine flour as described in Example 1. The 50% superfine flour has a degree of acidity (determined according to the method of Schulerud) of 15. 100 kg. of said rice germ flour are mixed with 100 liters of water containing dissolved therein 795 g. of sodium carbonate or 1.260 kg. of sodium bicarbonate. The mixture is converted into a paste by means of an endless screw-type mixer and is then transformed into flakes by means of a roller mill. The resulting flakes are of very agreeable taste free of any bitter material and are useful in the manufacture of food and phramaceutical preparations.

Example 4

Wheat germs are de-oiled by means of hydraulic presses. The resulting wheat germ cake is finely ground and milled to yield a 50% superfine flour. Said flour is mixed with 30% of soybean flour and 30% of Jerusalem artichoke flour. 100 kg. of said mixture are thoroughly kneaded with 100 liters of water containing an amount of sodium carbonate or sodium bicarbonate corresponding to the acid content of said mixture. The resulting paste is then converted into flakes by means of a roller dryer as described in the preceding examples. The flakes obtained thereby can be used as food preparation for diabetics.

Roller or drum dryers to be used in the process according to the present invention operate in such a manner that the pasty material is applied to a revolving heated metal drum which conducts heat to the wet film spread over the surface of said roller or drum and thereby evaporates the water during partial revolution of the drum. The dry material is scraped from the drum by a stationary knife. The most preferred roller or drum dryers used in the process according to the present invention are double-drum dryers in which the direction of rotation is downward. Care must be taken that the reservoir for feeding the cereal germ paste to said double-drum dryer is separated from said heated drums. This is best achieved by using a single or double transfer roll for transferring the paste to the drums. Such transfer rolls, in contrast to the drying rollers or drums, are not heated. Thereby the danger is eliminated that the paste to be dried remains in contact with the drying drums for too long a period of time and, consequently, is adversely affected by the high drying temperature. Twin-drum dryers having two drums turning in a direction opposite to the double-drum dryer, i.e. upwardly, may also be used. The cereal germ paste is also transferred to the drum surface by means of a single or double unheated transfer roll. Such transfer roll or rolls may also be placed near the top of the drum. Single or multiple roller or drum-dryers may likewise be used if provided with transfer rolls for applying the paste to said rollers or drums. Preferably the rollers or drums are provided with several smoothing rolls which continuously smooth the drying paste layer that initially, due to vigorous evaporation, becomes uneven and rough, and which firmly press and force said paste layer against the drying roller or drum, thus, ensuring satisfactory heat transfer and, thus, better drying performance.

In principle, drying of the cereal germ paste to yield flakes requires a drying process whereby the paste to be dried is applied to a moving drying surface of heat conducting material heated from the side opposite to said drying surface. The material to be dried is exposed to drying heat only for a short period of time sufficient to form flaky dried material. Thereby the paste to be dried, before being supplied to the drying surface, and the drying surfaces are not in direct contact with each other so that the drying surface does not cause substantial increase in the temperature of said paste and, thus, does not adversely affect its composition nor its nutritional value.

Since the general construction and the details in dryers of this roller or drum-dryer type are well known and familiar to those skilled in the art, and since said dryers are large and elaborate structures it is not considered to be necessary for an understanding of this invention to illustrate and describe the same.

The same applies to the cascade cleaning machines which are used, for instance, for sorting, grading, and purifying semolina and the like products. Such a machine sorts and grades the starting semolina according to its specific gravity and operates with wind suction or aspiration. The cereal germ flakes are uniformly and steadily supplied to said machine by means of feeding rollers and adjustable inlet flaps or shutters. Heavy semolina or middlings are deposited in the front chambers and light semolina or middlings in the rear chambers. Such machines are well known to the art and need not be described in detail herein.

As tearing apparatus for equalizing the crude flakes leaving the dryer there may advantageously be used crushing devices of the type employed in crushing oilseed cakes and the like.

Dry-degerminating of corn according to the process developed by Dr. F. Grandel is, for instance, carried out according to the process and with the device described in German Patents No. 715,156 and 729,662. Of course, other processes of separating germs from cereal seeds in the dry state, i.e. without any moistening of said seeds, may also be used.

The cereal germ residues obtained on grinding the de-oiled germs are either used as such or after addition of diastatic ferments as feed for young animals, especially calves. They may first be subjected to an enzymatic treatment as this is described more in detail in German Patent No. 840,047 mentioned hereinbefore.

The substantially de-oiled cereal germs are preferably ground according to that type of flour grinding processes wherein the material to be ground is passed through several grinding steps. The material, during the first grinding steps, is merely crushed and broken up to comparatively large grit-like particles, large particles of the cereal grain shells or husks, and only a very small percentage of fine flour. The shell or husk particles and the fine flour are separated and the large grit-like particles are more and more reduced in size by subsequent grinding steps. Thereby the shell or husk particles which are still present in the material to be ground are more and more and finally almost completely separated from the superfine flour particles obtained in the last grinding steps. In this manner it is possible to substantially remove all the fiber and bran particles present in the starting de-oiled germs. In contrast to such a "high grinding process," the "flat grinding process," whereby a large quantity of flour is obtained on the first passage through the grinding device, yields a cereal germ flour which is not as suitable for conversion into flakes since it contains considerably higher amounts of bitter components present in the bran and husks of the cereals.

Determination of the degree of acidity according to the method of Schulerud mentioned hereinbefore, is carried out as described, for instance, in "Cereal Chem.," vol. 10, page 129 (1933). Said method consists in principle in extracting 10 g. of flour with 100 cc. of 67% ethanol and titrating the alcoholic extract with N/10 sodium hydroxide solution and phenolphthalein as indicator.

It may be mentioned that the degree of comminution as indicated by the term "50% superfine flour," comprises a flour which contains at the most 50% of the shells or husks of the starting cereal material. Accordingly a superfine flour between 0% and 50% contains considerably less crude fiber, pentosans, proteins, and mineral matter than a less fine flour between 51% and 80%.

I claim:

In a process of producing debittered stable flakes from cereal seed germs, the steps which comprise providing an aqueous paste of a cereal seed germ material of an oil content not exceeding about 4% and a degree of comminution corresponding to an about 50% superfine flour and drying and flaking said paste in a moving thin layer with only short exposure to a temperature between about 130° C. and about 140° C., thereby causing heat transfer indirectly to said thin layer of paste from one side only through metallic conductor material, said paste not being affected by and not heated by contact with the drying zone.

References Cited in the file of this patent

UNITED STATES PATENTS

| | | |
|---|---|---|
| Re. 22,748 | Levin | Apr. 30, 1946 |
| 1,586,869 | Wesener | June 1, 1926 |
| 2,130,087 | Hasbrouck | Sept. 13, 1938 |
| 2,135,445 | Walsh | Nov. 1, 1938 |
| 2,450,123 | Cryns | Sept. 28, 1948 |

FOREIGN PATENTS

| | | |
|---|---|---|
| 401,941 | Great Britain | Nov. 23, 1933 |

OTHER REFERENCES

"Chemical Engineers Handbook," 3rd edition, 1950, by Perry (editor), published by McGraw-Hill Book Co. (New York), pp. 863–864.